Aug. 16, 1932. J. D. PETERSEN 1,872,494
PROCESS OF MAKING RADIATOR CORES
Filed Sept. 16, 1926 2 Sheets-Sheet 1
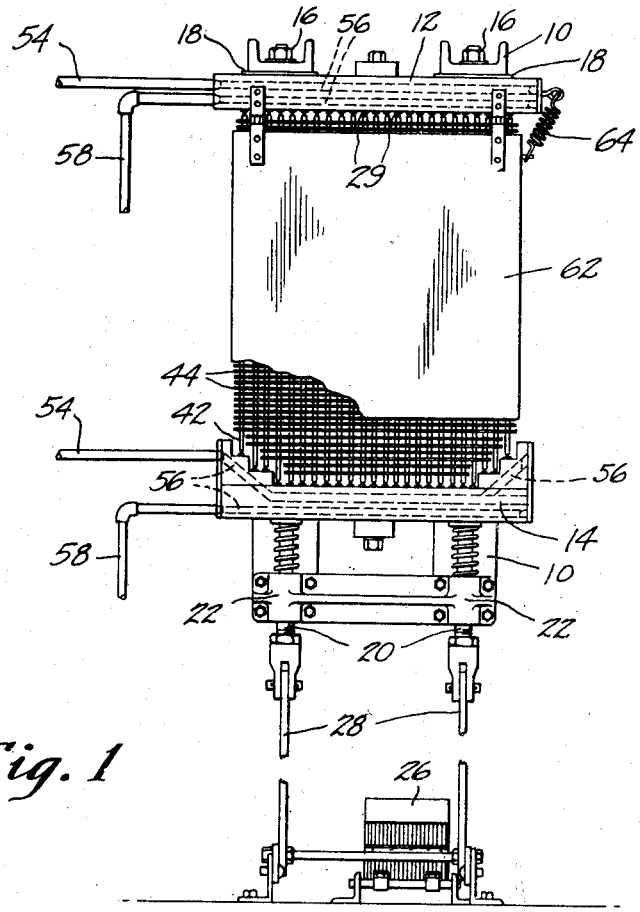
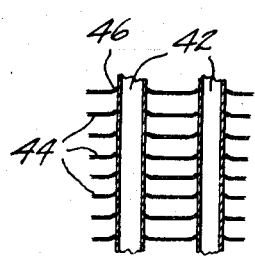
Fig. 4
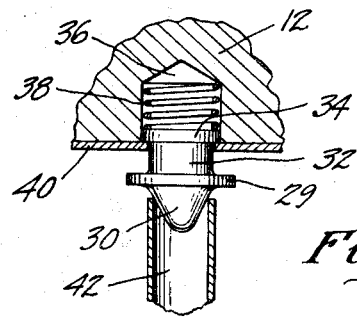
Fig. 5
Inventor
John D. Petersen
By
Attorney Aug. 16, 1932.  J. D. PETERSEN  1,872,494

PROCESS OF MAKING RADIATOR CORES

Filed Sept. 16, 1926  2 Sheets-Sheet 2

Inventor
JOHN D. PETERSEN
King Harness
Attorney

Patented Aug. 16, 1932

1,872,494

UNITED STATES PATENT OFFICE

JOHN D. PETERSEN, OF DETROIT, MICHIGAN

PROCESS OF MAKING RADIATOR CORES

Application filed September 16, 1926. Serial No. 135,962.

This invention relates to a method for soldering and more particularly to a method of soldering the fins to the tubes of a radiator for automobiles and the like.

In the manufacture of radiator cores having a plurality of tubes, spaced by radiating fins, it has been the usual practice to force the tubes through spaced fins and heat the core in an oven to a point where the solder on the outer surface of the tubes begins to flow and forms a soldered joint between the fins and the tubes. This method of heating is necessarily slow and objectionable in that the heat is applied to the fins and conducted therethrough to the tubes. As the annealing point of copper or brass fins is very close to the melting point of solder, it often results in annealed fins which have lost their original strength.

To this end the invention consists in applying heat directly to the tubes and as an object of the invention, a low voltage electric current is applied to the tinned tubes, which through the passage of current, will cause the solder to melt and secure the metal fins to the tubes.

Another object is to provide a clamping device which will hold the core under a spring tension while being soldered, allowing the core to expand in a longitudinal direction when heat is applied thereto.

A further object is to provide a timing device in the circuit whereby the length of time that current is supplied will be regulated.

These and other objects will more fully appear from the following description taken in connection with the accompanying drawings, in which:

Fig. 1 is a front elevation of a machine showing a radiator core in position, parts being broken away.

Fig. 4 is a sectional view through a portion of the core.

Fig. 5 is a sectional view showing one of the tube contact members.

Figure 2:
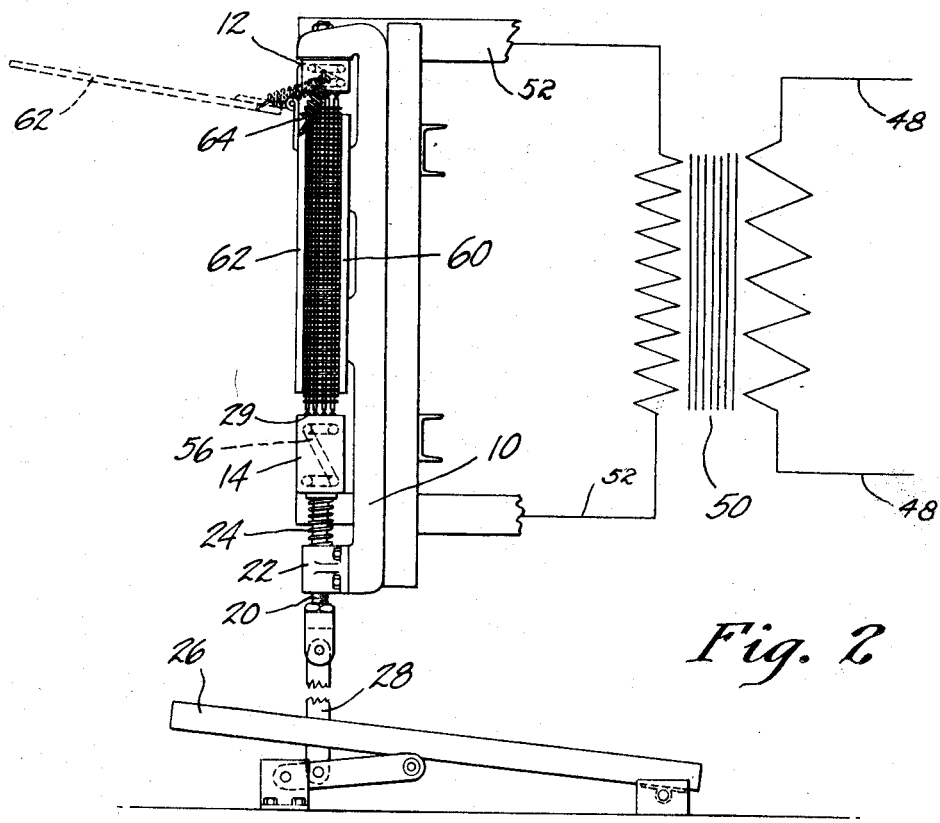
Fig. 2 is a side elevation of Fig. 1.

My invention contemplates broadly, any suitable means for resiliently holding between electrical terminals a series of water tubes previously coated with a soldering material and spaced by radiating fins whereby the tubes are heated by an electrical current causing the soldering material to fuse and securing the tubes and fins together as a unit or radiator core.

The machine selected for illustration is shown diagrammatically comprising a horizontal support 10, having an upper terminal 12 and a lower terminal 14. The upper terminal 12 is secured to the support 10 by bolts 16 and is insulated therefrom as at 18. The lower terminal 14 is supported on a pair of reciprocating arms 20 mounted in bearings 22 carried by the support 10. Springs 24 between the bearings 22 and terminal 14 resiliently urge the terminal upward and a lever 26 connected through suitable linkage 28 is adapted to pull the terminal downward against the resistance of the springs.

Each of the terminals 12 and 14 are provided with a plurality of contact members 29, corresponding in position and number to that of the water tubes. These contact members may be rigidly secured to the terminal but to provide for any variation in the lengths of the tubes, and to insure a good contact therewith, an upper contact member has been shown, Fig. 5, resiliently secured to the terminal.

Referring to Fig. 5, the contact member is provided with a conical tip 30 adapted to enter one end of a tubular member 42 and a shank portion 32. A collar 34 is held within an opening 36 in the terminal 12 and a spring 38 within the opening 36 resiliently urges the contact member outwardly engaging the tube 42. A plate 40 adapted to fit around the shank 32 retains the collar 34 within the opening 36.

A portion of a radiator core is shown in Fig. 4 comprising a plurality of tubes 42 inserted through openings in spaced fins 44. The opening in each fin is slightly smaller than the outer diameter of the tube so that when the tube is inserted, a flange or burr 46 is formed around the outer periphery of the tube. Each tube is previously coated with a soldering material before it is inserted through the fins.

After the tubes have been forced in the fins the core is dipped in a soldering acid solution or soldering flux and then placed between the terminals 12 and 14 with the lower end of each tube is engagement with the contact members 29 of the lower terminal 14. The lever 26 is released and the springs 24 raise the core and lower terminal to a position where the upper ends of the tubes are in engagement with the contact members 29 of the upper terminal 12. An electrical current is then conducted through the terminals and tubes causing the outer coated surface of the tubes to melt and flow around the burrs 46; the current being supplied through leads 48, transformer 50 and leads 52, hereinafter described more in detail.

The upper and lower terminals are provided with water inlets 54, passages 56 and outlets 58 whereby a circulation of water is provided to cool the terminals.

As a radiator is designed to be a good conductor of heat, back and front covers 60 and 62 respectively have been shown to confine the heat within the core and to prevent dissipation of heat. Such covers are preferably made of asbestos board, the back cover 60 being secured to the support 10 and the front cover 62 being pivoted to the upper terminal in such a manner that it can be raised when the core is removed and another inserted. An over center spring 64 has been provided to maintain the front cover in an open or closed position.

The electrical system selected for the operation of the device comprises a main circuit, a secondary or low voltage circuit for heating the tubes, a relay for closing the primary circuit, any suitable timing device for automatically breaking the circuit at a predetermined interval, and a switch for automatically throwing into operation all of said elements.

Figure 3:
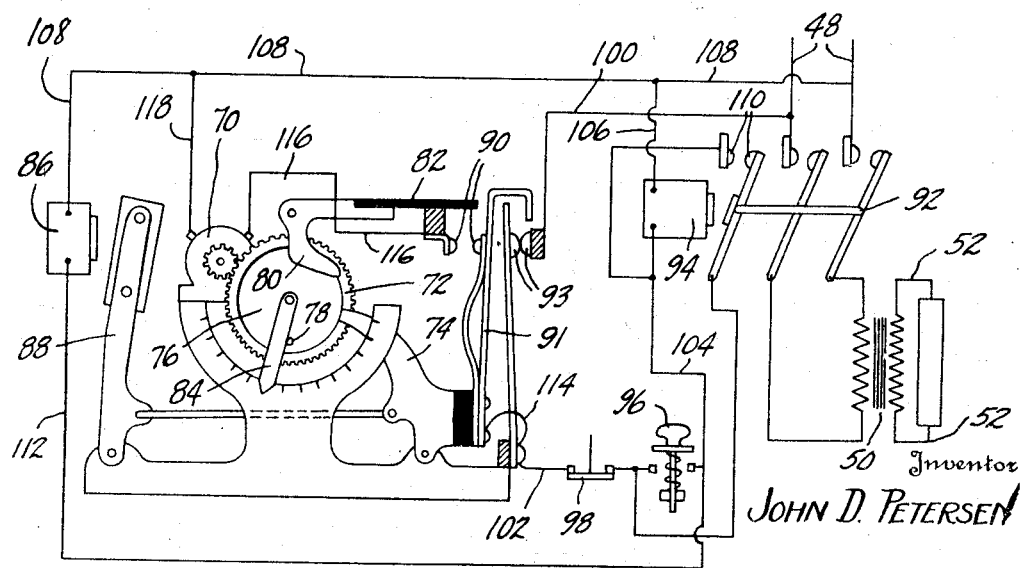
Fig. 3 is a wiring diagram of an electrical circuit used.

In Fig. 3 a suitable timing element has been shown comprising a motor 70 driving a planetary gearing 72, which when certain gears, not shown, are held by the pawl 74 a disc 76 is rotated counter-clockwise and a pin 78 carried by the disc engages to a cam 80 raising an insulated stop 82 which breaks the circuit, releasing the pawl 74. The disc 76 is then returned to its original position with the pin 78 engaging an adjustable stop 84, the position of which determines the length of time the circuit is closed.

A magnetic coil 86, when energized, causes an arm 88 to bring the pawl 74 into engagement with the gearing, close the motor circuit through terminal 90 and engages under tension a resilient arm 91 against the insulated stop 82. When this stop is raised as above described the resilient arm 91 breaks the contact of terminals 93.

A switch 92, closed by a magnetic coil 94 and opened by gravity or a suitable tension device, is adapted to close and open the main circuit to the transformer 50. A control switch 96 is normally open, preferably of the push button type, and a safety switch 98, when open, is adapted to open the entire circuit so that it is impossible to obtain a complete circuit through any of the operating parts.

Following the source of current and in the operation of the device, the current is supplied from the leads 48 through the switch 92, transformer 50, leads 52 and tubes 42 of the radiator core. Momentarily closing of the switch 98 causes a current to be conducted from one of the leads 48, through lead 100, terminals 93, lead 102, switch 98, switch 96, lead 104, magnetic coil 94, lead 106 and back to the other lead 48 through lead 108. This circuit energizes the magnetic coil 94 which closes the switch 92 causing terminals 110 to close and complete a shunt circuit around the switch 96 so that its closed position is no longer necessary for operation of the device as the terminals 110 complete the circuits for the magnetic coils 94 and 86 and the motor 70.

When the switch 96 is closed the magnetic coil 86 is energized in parallel with the coil 94, the current being conducted from lead 100, through terminals 93, lead 102, switch 98, switch 96, lead 112, magnetic coil 86, lead 108 and back to the other lead 48 of the main line. This circuit causes the arm 88 to engage the pawl 74 and closes the motor circuit with the resilient arm 91 against the insulated stop 82. The terminals 93, up to this point of operation, are in contact. With the terminals 90 closed, the motor 70 receives its energy from lead 100, through terminals 93, lead 114, terminals 90, lead 116, motor 70, lead 118 and lead 108 back to the opposite side of the main circuit. With the motor running, the disc 76 rotates in a counter clockwise direction until the pin 78 strikes the cam 80 lifting the insulated stop 82 and the resilient arm springs to the left of the figure breaking the contact of the terminals 93. This broken contact cuts off all current supplied to all operating parts through lead 100, or one side of the main circuit. The magnetic coils are no longer energized and the entire system takes a position as shown by the figure.

It will be understood that by such an arrangement it is only necessary for the operator to momentarily close the switch 96 and the system is entirely automatic, supplying a current to the tubes of a radiator core for a predetermined interval. The electrical energy supplies heat directly to the tubes causing the solder coated surface to fuse joining the fins and tubes together.

With a machine of the character described the heat is confined to the region where it is required and the fins are not annealed but retain their original strength.

It will be understood that various changes in construction may be made in my improved method, including arrangement, combination and construction of the various parts, without departing from the spirit thereof and it is not my intention to limit its scope other than by the terms of the appended claims.

What I claim is:

1. The method of assembling a radiator core comprising the forcing of water tubes, having a coating of fusible material, through spaced fins of thin flexible material, dipping the core thus assembled in a soldering acid solution, placing the core between electrical terminals, heat insulating the front and rear faces of said radiator core, passing an electrical current through said tubes whereby the coating on the tubes is fused firmly uniting the same when cooled.

2. In manufacturing radiator cores of the type which include a plurality of tubes having transverse fins threaded thereon, the method of assembling a core which consists in coating the tubes with a fusible material, forcing said tubes through restricted apertures in the fins so as to temporarily hold said fins in spaced relation, applying a fluxing agent to said fins and tubes, supporting said core by yielding endwise engagement with the extremities of said tubes, heat insulating at least one face of said core, and passing an electric current through said tubes so as to fuse the coating thereon to said fins.

3. In manufacturing radiator cores of the type which include a plurality of tubes having transverse fins threaded thereon, the method of assembling a core which consists in coating the tubes with a fusible material, forcing said tubes through restricted apertures in the fins so as to temporarily hold said fins in spaced relation, applying a fluxing agent to said fins and tubes, supporting said core with the tubes thereof in a substantially vertically upright position by yielding endwise engagement with said tubes, heat insulating the respectively opposite faces of said core, and conducting electric currents longitudinally through each of said tubes from one supported end to the other supported end thereof so as to fuse the coatings of said tube to said fins.

4. In manufacturing radiator cores of the type which include a plurality of tubes having transverse fins threaded thereon, the method of assembling a core which consists in coating the tubes with a fusible material, forcing the tubes through restricted apertures in the fins, applying a fluxing agent to said fins and tubes, heat insulating the opposite side faces of said core, and passing an electric current through said core so as to heat the latter and fuse said coating to said fins.

5. In manufacturing radiator cores of the type which include a plurality of tubes having transverse fins threaded thereon, the method of assembling a core which consists in coating the tubes with a fusible material, forcing the tubes through restricted apertures in the fins, applying a fluxing agent to said fins and tubes, closing the passages between said fins adjacent at least one side face of said core, and passing an electric current through said core so as to heat the latter and fuse said coating to said fins.

JOHN D. PETERSEN.